United States Patent
Cain

(10) Patent No.: US 9,310,069 B2
(45) Date of Patent: Apr. 12, 2016

(54) THERMAL STORAGE CONDENSING BOILER OR HEAT EXCHANGER

(71) Applicant: Martin Cain, Salisbury, MD (US)

(72) Inventor: Martin Cain, Salisbury, MD (US)

(*) Notice: Subject to any disclaimer, the term of this patent is extended or adjusted under 35 U.S.C. 154(b) by 0 days.

(21) Appl. No.: 14/384,528

(22) PCT Filed: May 14, 2013

(86) PCT No.: PCT/US2013/040936
§ 371 (c)(1),
(2) Date: Sep. 11, 2014

(87) PCT Pub. No.: WO2013/173328
PCT Pub. Date: Nov. 21, 2013

(65) Prior Publication Data
US 2015/0040842 A1    Feb. 12, 2015

Related U.S. Application Data

(60) Provisional application No. 61/688,458, filed on May 15, 2012.

(51) Int. Cl.
| | | |
|---|---|---|
| *F24H 8/00* | (2006.01) | |
| *F22B 19/00* | (2006.01) | |
| *F22B 13/02* | (2006.01) | |

(52) U.S. Cl.
CPC .............. *F22B 19/00* (2013.01); *F22B 13/02* (2013.01)

(58) Field of Classification Search
CPC .......... Y02B 30/102; F24H 1/186; F24H 8/00
USPC .................................. 122/15.1, 18.1, 31.1, 33
See application file for complete search history.

(56) References Cited

U.S. PATENT DOCUMENTS

| | | | | |
|---|---|---|---|---|
| 6,662,758 B1* | 12/2003 | Shin | ........................ | F24H 8/00 122/18.1 |
| 6,907,846 B2* | 6/2005 | Hur | ......................... | F24H 1/40 122/18.1 |
| 8,555,821 B2* | 10/2013 | Morini | ...................... | F24H 1/40 122/235.11 |
| 2013/0125838 A1* | 5/2013 | Min | ......................... | F24H 8/00 122/20 B |

* cited by examiner

*Primary Examiner* — Gregory A Wilson
(74) *Attorney, Agent, or Firm* — Donald L. Dennison

(57) ABSTRACT

A very high efficiency steam producing heater and boiler is disclosed wherein an outer vault encases an inner casing with a small exhaust passage there between. The walls of the casing contain a series of capillary tubes through which water flows. A combustion chamber in the lower portion of the casing provides a source of heat for the water which flows from the casing into a series of water drums located near the combustion chamber. From the water tubes, the heated water then passes through a serpentine series of steam tubes and then upward into one or more steam drums. Steam passes through the steam drums out of the casing and vault for commercial or residential usage.

10 Claims, 7 Drawing Sheets

THERMAL STORAGE CONDENSING BOILER OR HEAT EXCHANGER

This application claims priority under 35 U.S.C. 119(e) to U.S. Provisional Application No. 61/688,458, filed on May 15, 2012, the contents of which are incorporated herein.

TECHNICAL FIELD

The present invention is concerned with improvements in fuel-fired boilers or heat exchangers which provide extremely high efficiencies. Steam produced by the boiler or heat exchanger of my invention may be used for heating and electrical power generation to provide low cost utilities to factories, residential communities, schools and the like.

BACKGROUND OF THE INVENTION AND PRIOR ART

The condensing boiler for production of steam is very old in the prior art and many examples of the same appeared in the mid to late 1880's. Note by way of example the United States patents, LeBosqquet U.S. Pat. No. 190,054, Allen et al. U.S. Pat. No. 193,069, and Brooks U.S. Pat. No. 272,373. There have however been very few significant developments in this old art that have taken place in modern times. As will be apparent herein, my new design results in a significantly higher degree of thermal efficiency for such condensing boilers or heat exchangers and will provide cheaper and more efficient energy than solar or wind energy generation.

The two most common forms of alternative energy today are wind and solar systems which normally operate at between 20 to 30% efficiency.

OBJECTS OF THE INVENTION

Among the attributes and objects of my invention are the provision of a thermal storage condensing boiler or heat exchanger for steam production that capitalizes on thermal mass storage for the purpose of generating steam over long periods of time, even after the source of fuel is removed, exhausted or is shut off.

It is a further object of my invention to achieve very high steam generation efficiency by means of heat transfer from the consumed fuel and the exhaust stream at a plurality of locations.

These, and other objects of my invention will be apparent from a reading of the following specification, drawings and claims.

SUMMARY OF THE INVENTION

The present invention comprises a boiler construction that relies upon thermal mass storage for the generation of steam which can be utilized for a variety of commercial and consumer purposes, including among others, the generation of electrical power, home and industrial heating of buildings and other structures.

The principal advantages of my new boiler construction are:

optimizing energy efficiency;

total consumption of supplied fuel in order to maximize energy and to minimize discharge of pollutants and harmful waste products;

obtaining the maximum thermal flywheel effect;

due to modular construction of the boiler, the entire unit may be assembled in a factory thereby minimizing very expensive field erection and fabrication as is common with prior art structures, and which ensures the high quality of the boiler;

the ability to customize the boiler for a variety of applications and locations;

the ability to achieve a variety of applications, including the generation of electricity, the production of steam for industrial purposes, the production of hot water or steam for HVAC systems in commercial or residential structures;

The ability to burn a wide variety of fuel sources, including, natural gas, coal, propane, biofuels, solid fuel materials, wood chips, animal carcasses, chopped wood, wood pellets, cardboard, etc.

My new boiler will run at 80% efficiency or better, depending upon the choice of fuel, resulting in use of less fuel and reduced carbon emissions.

DESCRIPTION OF THE DRAWINGS

These and other objects of my invention will be appreciated and understood by those skilled in the art from the detailed description of the preferred embodiment of the invention and from the following drawings in which.

DISCLOSURE OF INVENTION AND BEST MODE

Figure 1:
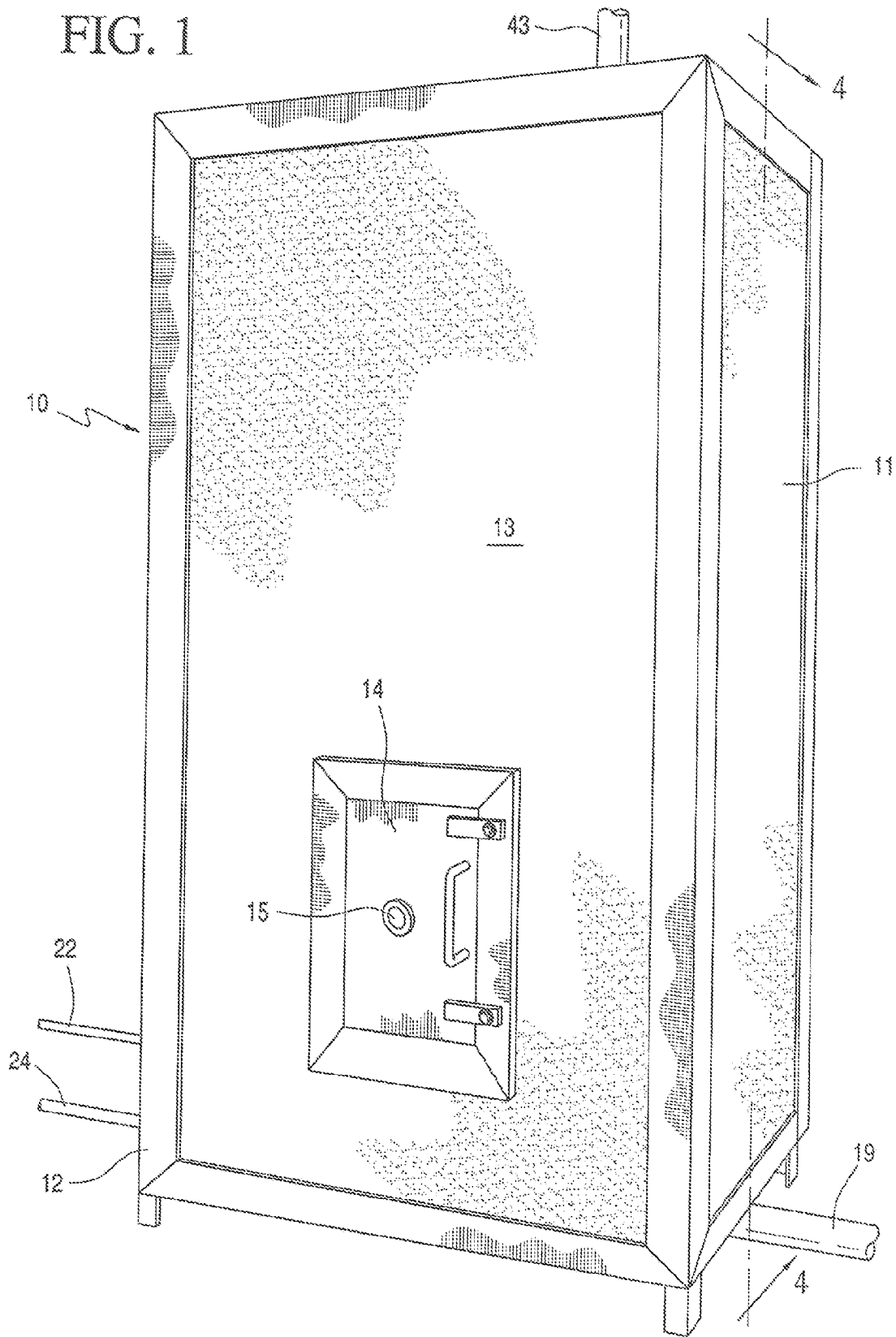
FIG. 1 is a front perspective view showing the installed thermal storage condensing boiler or heat exchanger.
Figure 2:
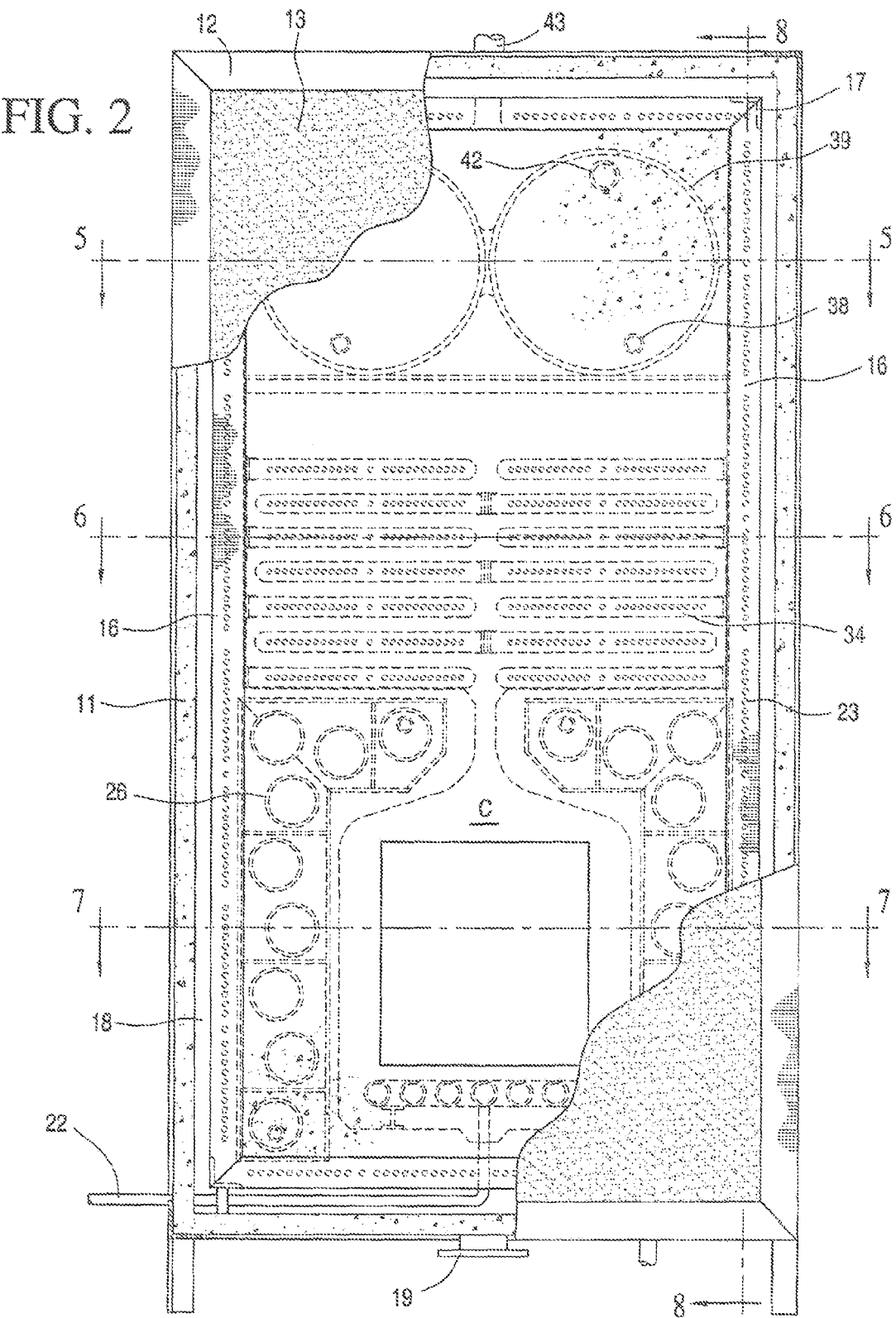
FIG. 2 is a front view of the invention with portions of the vault or sarcophagus cut away to show the details of the working components.

With reference to the drawings, wherein like reference numbers in the views refer to the same elements of my construction in the several view, the condensing boiler and heater exchanger is shown generally at 10 which includes an outer vault or sarcophagus 11 which is preferably formed of reinforced concrete or steel and has an open end.

The vault has a reinforcing steel frame 12 which provides rigidity and strength to the structure and is faced or clad with an aesthetically pleasing aluminum or metal skin on its exposed face as shown at 13. In order to provide a pleasing appearance, an ornate design or manufacturer's logo may be incorporated in the skin. The vault also serves as an explosion-proof casing.

The front face of the shell includes a steel door 14 for access to the combustion chamber and may include an inspection window 15 for viewing the system components.

A generally rectangular cross-section inner casing 16 serves to house the major components of my invention and is preferably formed of refractory concrete that is cast within its own steel angle frame 17. It will be seen that the inner casing 16 is spaced inwardly on all sides from the outer vault in order to provide an exhaust passage 18 for the passage of hot air which flows from the top of the unit downwardly to an exhaust outlet 19 leading to the outside of the unit.

Figure 4:
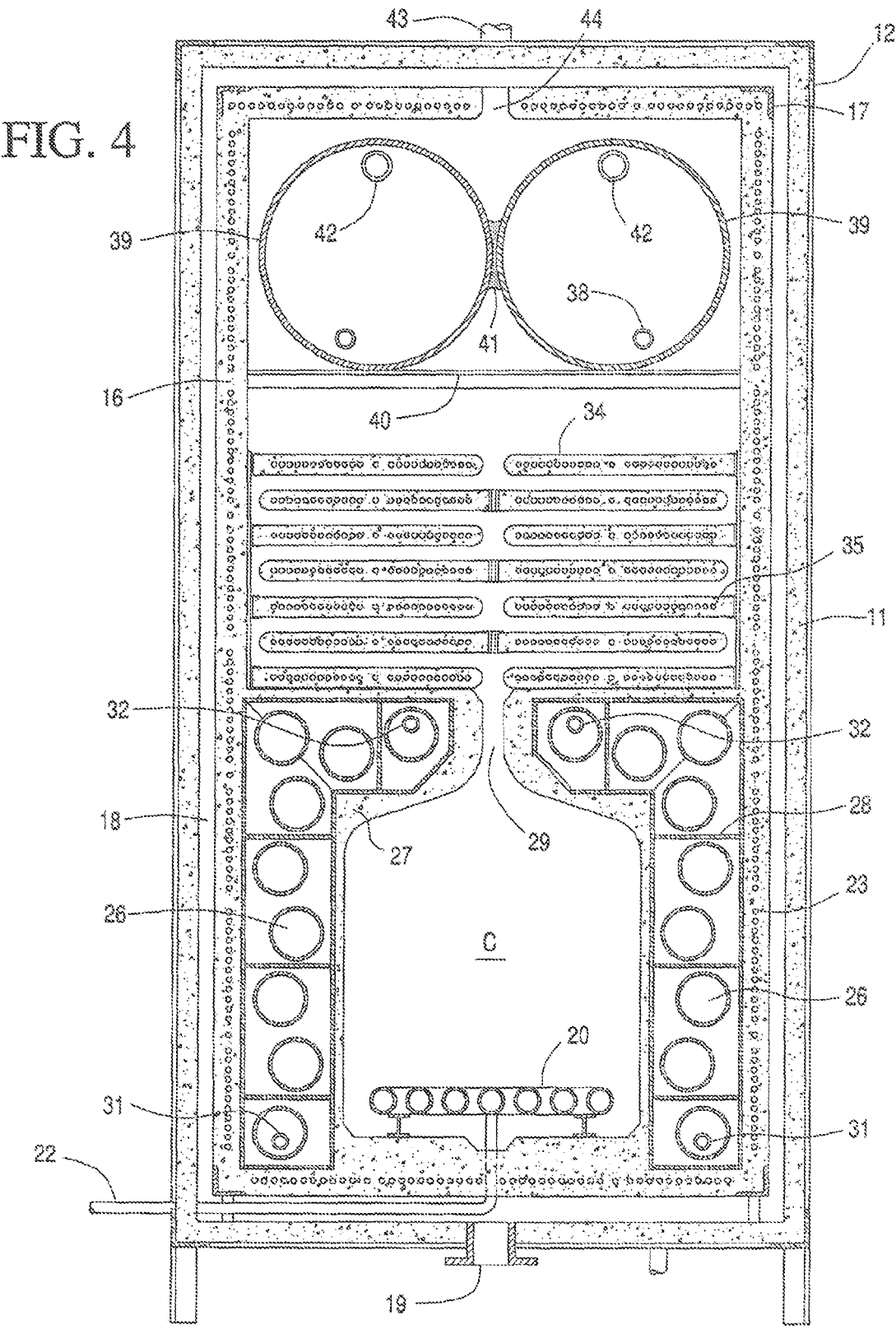
FIG. 4 is cross section of the boiler taken along the line 4-4 of FIG. 1.
Figure 5:
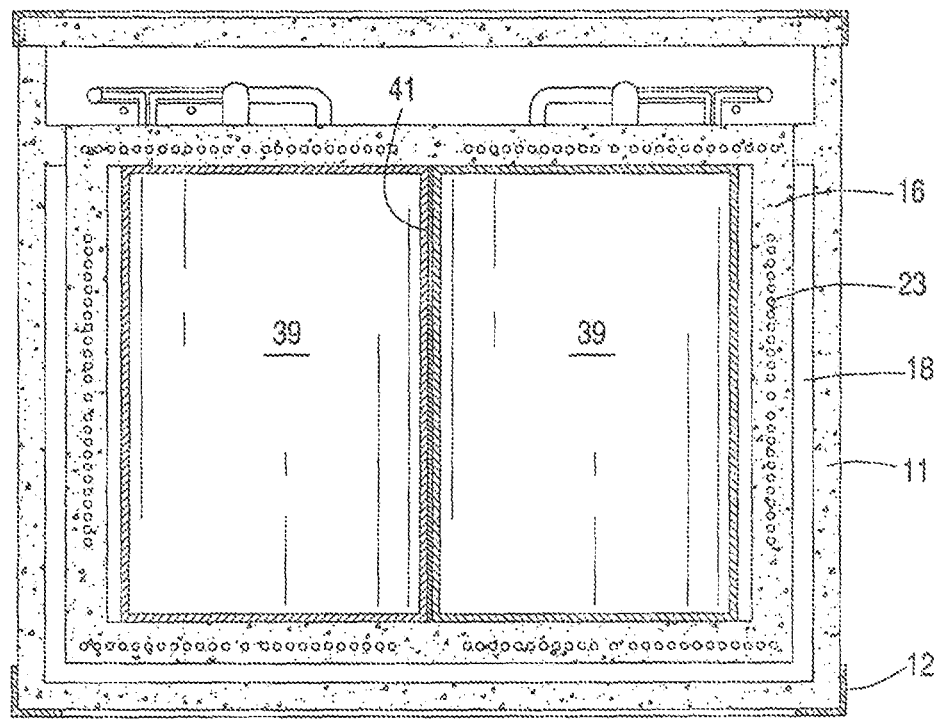
FIG. 5 is a sectional view taken along the line 5-5 of FIG. 2 showing the steam drums.
Figure 9:
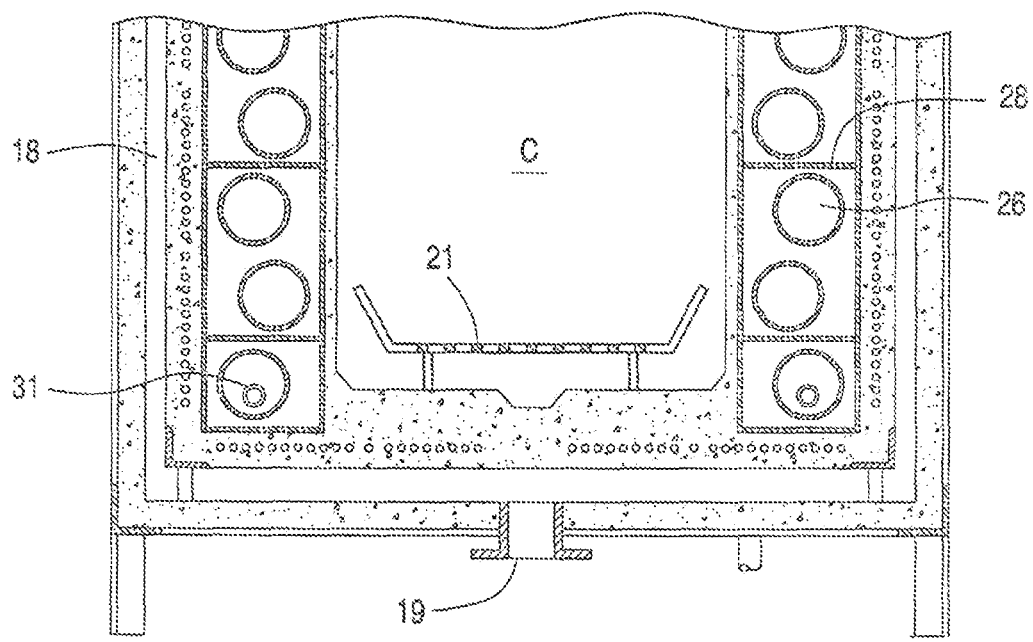
FIG. 9 is front view of the combustion chamber and water drums having an alternative fuel grate.
Figure 8:
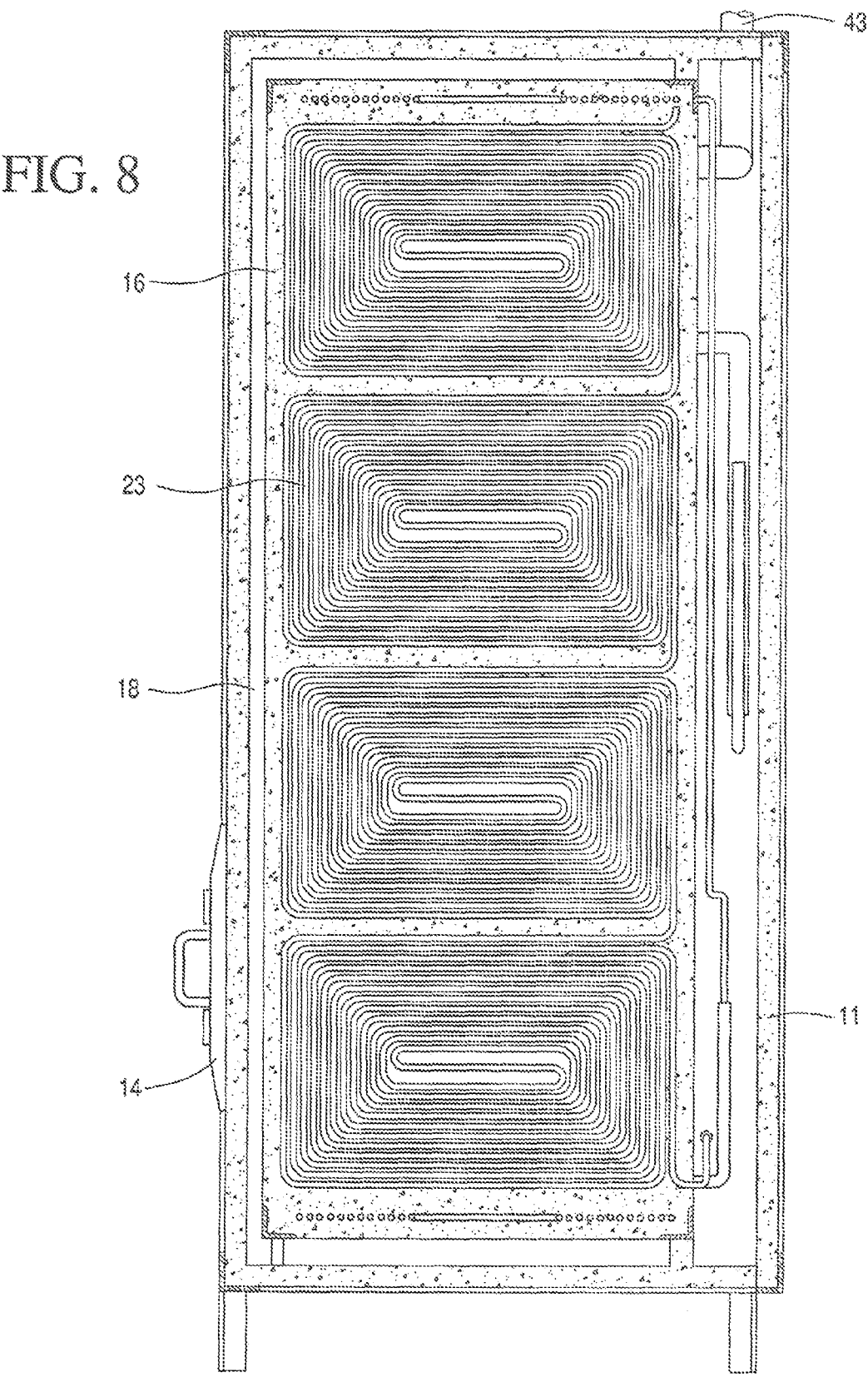
FIG. 8 is a sectional view taken along line 8-8 of FIG. 2 showing the water capillary water tubes within a side wall of the inner casing.

As best seen in FIG. 4, a combustion chamber C is provided in the lower portion of the inner casing and a burner assembly 20 or grate 21 (see FIG. 9) is supported therein. A gas or liquid fuel inlet line from the fuel source 22 leads into the burner assembly and a forced air blower (not shown) may be used for forced induction into the combustion chamber in order to ensure efficient burning of the fuel.

When a solid fuel source is employed an auger feed, common in the prior art, can be used to feed the fuel materials to the grate 21. See FIG. 9. As noted previously, many diverse types of solid fuels may be used including, coal, wood pellets, or even animal carcasses.

It will be noted that the inner casing has opposed side walls as well as opposed top and bottom faces to provide a tightly sealed enclosure with the exception of inlet piping for water make-up, fuel inlet, steam outlet and control wiring conduits.

In a preferred embodiment of the invention, the inner casing may be reinforced with steel fiber mesh to enhance energy conduction and to also serve to control cracking of the concrete.

Cast within each of the inner casing walls 16 are a series of interconnecting capillary water tubes 23 formed of copper or stainless steel. The tube diameter and thickness are designed to optimize the inlet water volume and heat transfer surface area, taking into account the losses due to friction associated with the water stream flow through the tubing circuits.

Figure 3:
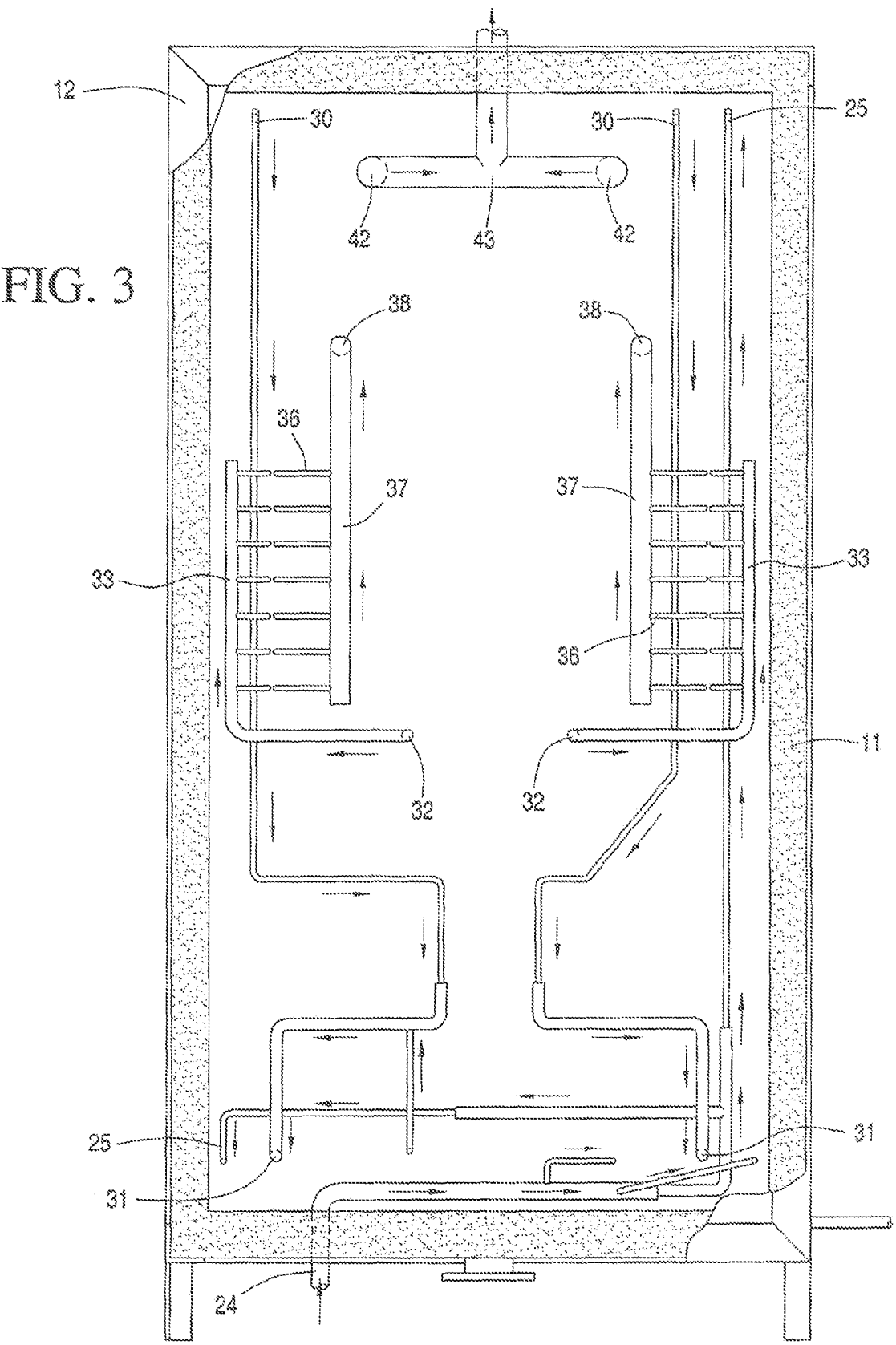
FIG. 3 is a rear view of the invention with portions cut away to show the tubes and piping.

These tubes form a serpentine pattern. A water inlet line 24 provides a flow of make-up water to the water tubes and the water is introduced to the tubes at several locations as for example at 25 as best seen in FIG. 3. It will be understood that water flows through the tubes 23 along each of the opposed walls where it receives heat from the combustion chamber. The water tubes have an inside diameter of approximately ¼ inch.

These circuits represent the initial areas of energy transfer to the water stream. By placing these circuits adjacent to the combustion chamber heat transfer therefrom is enhanced and additionally there is heat transfer from the exhaust gas stream that envelops the inner casing by means of the exhaust passage 18.

Located around the outside of the combustion chamber and inside of the water tubes are a plurality of water drums 26 having an inside diameter of preferably 3 inches and preferably formed of steel. These drums extend from front to back of the unit and are interconnected and of serpentine configuration. These drum units are also cast into the refractory concrete 27 that forms the combustion chamber C. Thus, a serpentine flow of water moves upwardly within the casing. Since the water drums have much larger volume than the aggregate volume of the capillary tubes, there will be a significant decrease in the inlet water stream velocity as it flows in the drums, thereby maximizing heat transfer from the refractory concrete to the inlet water stream.

The water drums are supported within their castings by separating frames or baffles 28.

The top of the combustion chamber narrows to an exit throat 29 and the drums are heated by close contact with the combustion chamber.

The flow of water from the capillary tubes passes via lines 30 (FIG. 3) to the water drum inlets 31.

Figure 6:
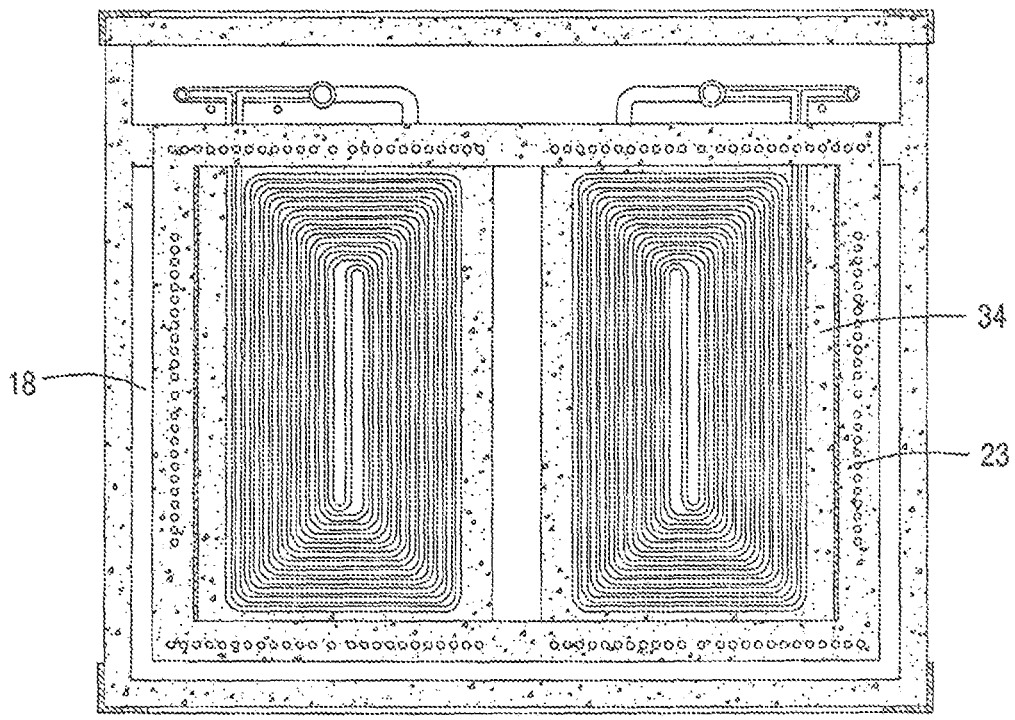
FIG. 6 is a sectional view showing the steam generating tubes taken along the line 6-6 of FIG. 2.
Figure 7:
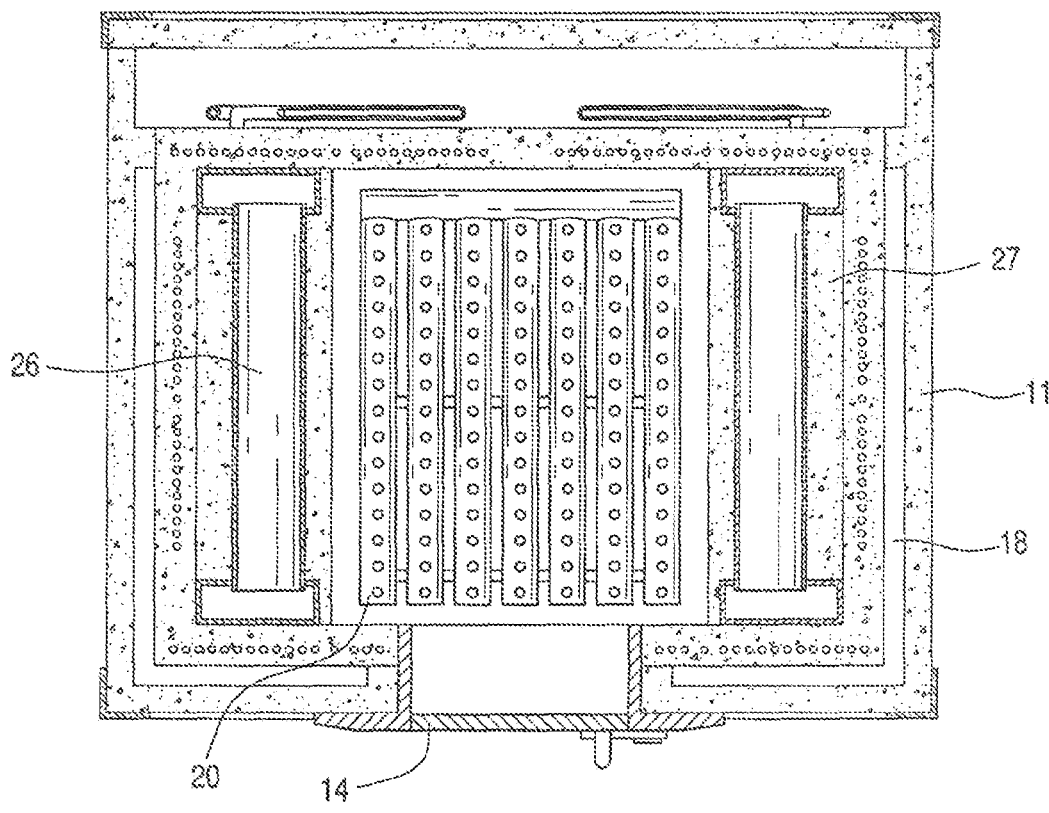
FIG. 7 is a sectional view through the water tubes and combustion chamber taken along line 7-7 of FIG. 2.

After completing the circuit through the water drums 26 the water exits via outlets 32 and into manifolds 33 which have a preferred inside diameter of ½ inch and which are connected to a series of steam generating tube assemblies 34. These assemblies of formed of small diameter (3/16 inches) preferably tubes on either side of the inner casing and arranged in interconnecting vertical rows as shown in FIGS. 4 and 6 with spaces between adjacent assemblies to permit the passage of heated air exiting from throat 29 and moving upwardly around the steam generating tubes.

The steam generating tubes are formed of stainless steel or copper and are encased in refractory concrete 35. This arrangement facilitates laminar flow of the heated air from the combustion chamber around the panels. The aggregate volume of the tubes within the steam generating assemblies is greater than the volume of the inlet manifold 33 which results in a decrease in pressure. Such pressure reduction facilitates a phase change of the inlet water into steam. The steam temperatures that have been measured suggest that such steam will be superheated and will contain substantially greater energy than saturated steam.

In tests, temperatures above the uppermost steam generating assemblies have been measured as at least 450° F. With forced induction and a secondary combustion chamber which could be included above the steam generating assemblies, temperatures of between 1,800° F. and 2,000° F. can be expected.

Steam passes out of the steam generating tubes 34 into manifolds 36 as seen in FIG. 3 and then it passes through larger diameter pipes 37 having an inside diameter of about ½ inch. These pipes lead to inlet ports 38 located at the bottom of steam drums 39.

The steam drums are suspended adjacent the top of the inner casing and may rest on a horizontal shelf 40. These drums are formed of steel and are thick-walled pressure vessels designed to withstand the high pressures and temperatures of the steam that is contained therein.

In the preferred embodiment shown, two drums are provided that are tacked together in contact at 41 throughout their length so that exhaust heated gases move around them. The drums will extract additional energy from the upward flowing heated air from the combustion chamber. For smaller installations, a single drum could be used.

Drums 39 do not require insulation since they are located within an area in the inner casing where the temperatures may be in excess of 450° F.

Steam exits from the drums via outlet openings 42 and via an outlet manifold 43 to an external system or power plant as desired where the steam may be used for a variety of industrial and commercial uses such as an electrical generator for supplying electrical power.

Exhausted hot air that has moved upwardly through the assembly from the combustion chamber C passes through the opening 44 where it enters the passageway 18 surrounding the inner casing and flows downwardly, eventually, exiting the unit at 19.

For the purposes of monitoring and control, temperature and pressure sensors may be installed at various strategic locations in the boiler. This is of importance since the inlet water stream extracts energy from the exhaust gas flow at a number of different locations.

Both the temperature and pressure of the inlet water may be monitored prior to its entry into the wall tubes. It is also monitored in the manifold connecting the wall tube assemblies to the water drums and between the drums and the steam generating panels. Additionally, these conditions may be monitored again between the steam generating panels and the steam drums and final measurements may be taken at the point where the steam exits the boiler as at 43 and connects with the system or appliance being supplied with the steam.

Internal temperatures within the unit may be measured at various strategic locations within the unit and within the outer vault casing and the inner casing.

It is also contemplated that the exhaust gases exiting the unit will be monitored to determine pollutant levels and the presence of unburned hydrocarbons. Such monitoring devices are well known in the prior art.

Through the use of computer software that is not part of my invention, the monitored data can be used to adjust fuel feed rates and combustion air induction rates in order to achieve optimum burn performance.

Accordingly, with the proper monitoring sensors and controls, on-site or remote operation of the condensing boiler may be achieved without extensive specialized knowledge on the part of the operator.

Tests by an independent testing company have shown that with a low fire or ½ throttle and a combustion chamber temperature of 1820° F., 134,640 BTU/HR are provided with an efficiency of greater than 85%. At a high fire or full throttle, and a combustion temperature of 1850° F., 226,440 BTU/HR are produced with an efficiency also over 85%.

The invention claimed is:

1. A high efficiency condensing heater and boiler comprising;
    an outer vault of generally rectangular cross-section;
    an inner generally rectangular cross-section casing received within said vault and having opposed top and bottom walls and opposed side walls,
    said walls being formed of concrete and spaced inwardly of said vault to provide an exhaust passageway there between,
        a plurality of capillary serpentine water tubes formed within said concrete walls to permit the flow of water there-through and having a water inlet and an outlet,
        a combustion chamber within the lower portion of said casing,
        a source of fuel in said chamber,
        a plurality of water drums located above said combustion chamber for receiving heated water from the outlet of said capillary tubes,
        said water drums extending in a serpentine manner longitudinally of said casing and having an inlet and an outlet,
        a series of steam generating tubes located above said water drums and receiving heated water from the outlet of said water drums and extending in a serpentine fashion longitudinally of said casing,
        said water drums and said steam generating tubes being exposed to heated air rising from said combustion chamber,
        at least one steam drum supported above said steam generating tubes and having an inlet and an outlet and receiving steam therefrom,
        said steam drum being exposed to heated air rising from said combustion chamber,
        the heated air exhausting from said casing adjacent the top thereof and passing through said exhaust passageway between the casing and said vault,
        and an outlet from said one or more steam drums for the passage of steam out of said vault.

2. The heater and boiler as set forth in claim 1 and wherein a plurality of steam drums are provided supported above said steam generating tubes.

3. The heater and boiler as set forth in claim 2 and further including a manifold interconnecting the outlet from each of the steam drums.

4. The heater and boiler as set forth in claim 1 and further including a secondary combustion chamber located below said at least one steam drum.

5. The heater and boiler as set forth in claim 1, wherein said water drums are encased in concrete.

6. The heater and boiler as set forth in claim 1 and further including a decorative skin on the outside of said vault.

7. The heater and boiler as set forth in claim 1, wherein gas burner means are situated within said combustion chamber.

8. The heater and boiler as set forth in claim 1, wherein a grate for holding and burning solid fuel is situated within said combustion chamber.

9. A high efficiency condensing heater and boiler comprising;
    an outer vault of generally rectangular cross-section;
    an inner generally rectangular cross-section casing received within said vault and having opposed top and bottom walls and opposed side walls, said walls being formed of concrete,
    a plurality of capillary serpentine water tubes encapsulated within said concrete walls to permit the flow of water there-through and having a water inlet and an outlet,
    a combustion chamber within the lower portion of said casing,
    a source of fuel in said chamber,
    a plurality of water drums located above said combustion chamber for receiving heated water from the outlet of said capillary tubes,
    said water drums extending in a serpentine manner longitudinally of said casing and having an inlet and an outlet,
    a series of steam generating tubes located above said water drums and receiving heated water from the outlet of said water drums and extending in a serpentine fashion longitudinally of said casing,
    said water drums and said steam generating tubes being exposed to heated air rising from said combustion chamber,
    at least one steam drum supported above said steam generating tubes and having an inlet and an outlet and receiving steam therefrom,
    said steam drum being exposed to heated air rising from said combustion chamber,
    the heated air exhausting from said casing adjacent the top thereof,
    and an outlet from said one or more steam drums for the passage of steam out of said vault.

10. The heater and boiler as set forth in claim 9, wherein said steam generating tubes are encased in concrete.

\* \* \* \* \*